US010451136B2

(12) United States Patent
Jerisk et al.

(10) Patent No.: US 10,451,136 B2
(45) Date of Patent: Oct. 22, 2019

(54) HIGH CREEP RESISTANCE PLASTIC MATERIAL REINFORCED RINGS

(71) Applicant: Continental Automotive Systems, Inc., Auburn Hills, MI (US)

(72) Inventors: Joseph G Jerisk, Burton, MI (US); Garrett Mark Pniewski, Bloomfield Hills, MI (US); Sunny Makkar, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/877,913

(22) Filed: Jan. 23, 2018

(65) Prior Publication Data

US 2019/0186579 A1 Jun. 20, 2019

Related U.S. Application Data

(60) Provisional application No. 62/599,114, filed on Dec. 15, 2017.

(51) Int. Cl.
| | |
|---|---|
| *F16F 9/36* | (2006.01) |
| *F16F 9/04* | (2006.01) |
| *B60G 11/27* | (2006.01) |
| *F16F 9/05* | (2006.01) |
| *B29C 45/16* | (2006.01) |
| *B29K 77/00* | (2006.01) |

(Continued)

(52) U.S. Cl.
CPC ............ *F16F 9/0463* (2013.01); *B60G 11/27* (2013.01); *F16F 9/0454* (2013.01); *F16F 9/05* (2013.01); *B29C 45/16* (2013.01); *B29K 2077/00* (2013.01); *B29K 2995/0083* (2013.01); *B29L 2031/721* (2013.01); *B60G 2202/152* (2013.01); *B60G 2206/424* (2013.01); *B60G 2206/7104* (2013.01); *B60G 2206/81012* (2013.01); *B60G 2800/162* (2013.01); *F16F 9/38* (2013.01); *F16F 2224/02* (2013.01); *F16F 2226/04* (2013.01)

(58) Field of Classification Search
CPC ........ F16F 9/0054; F16F 9/057; F16F 9/0063; B60G 15/14; B60G 11/27; B60G 11/28
USPC .......................................... 267/64.19–64.28
See application file for complete search history.

(56) References Cited

U.S. PATENT DOCUMENTS

| 4,899,995 A | * | 2/1990 | Hoffman | ............... | F16F 9/0454 |
|---|---|---|---|---|---|
| | | | | | 267/64.24 |
| 4,946,144 A | * | 8/1990 | Geno | .................... | F16F 9/0463 |
| | | | | | 267/64.27 |

(Continued)

*Primary Examiner* — Christopher P Schwartz

(57) ABSTRACT

A support ring used as part of an air spring assembly, where the support ring provides support for a top cap against radial forces applied by a clamping ring. The support ring is made of a plastic material which is less costly than a metal support ring. The plastic material is a high creep resistance plastic material, which provides increased strength and improved creep resistance, to withstand the compressive radial forces of the clamping ring. Once the support ring is formed, the top cap, which is also made of plastic, is overmolded such that a portion of the top cap is overmolded around the support ring. The high creep resistance plastic material is oriented during the injection molding process around the entire circumference of the support ring, to provide sufficient strength to withstand the radial forces from the clamping ring.

15 Claims, 2 Drawing Sheets

(51) Int. Cl.
 *B29L 31/00* (2006.01)
 *F16F 9/38* (2006.01)

(56) References Cited

U.S. PATENT DOCUMENTS

| | | | |
|---|---|---|---|
| 2003/0067103 A1* | 4/2003 | Easter | B60G 17/0528 267/64.28 |
| 2005/0253316 A1* | 11/2005 | Harms | F16F 9/057 267/64.27 |
| 2006/0273501 A1* | 12/2006 | Taylor | F16F 9/0454 267/64.27 |
| 2011/0115140 A1* | 5/2011 | Moulik | B60G 15/14 267/64.23 |
| 2014/0061983 A1* | 3/2014 | DeBruler | F16F 9/05 267/64.27 |
| 2014/0061984 A1* | 3/2014 | Hart | B60G 11/28 267/64.27 |
| 2016/0102727 A1* | 4/2016 | Schallmeier | B60G 11/27 267/64.27 |
| 2018/0134994 A1* | 5/2018 | Steele | D06M 11/34 |

* cited by examiner

HIGH CREEP RESISTANCE PLASTIC MATERIAL REINFORCED RINGS

CROSS-REFERENCE TO RELATED APPLICATIONS

This application claims the benefit of U.S. Provisional Application No. 62/599,114 filed Dec. 15, 2017. The disclosure of the above application is incorporated herein by reference.

FIELD OF THE INVENTION

The invention relates generally to an air spring assembly having a plastic support ring used for providing support for a connection between a bellow and one or more components of the air spring assembly.

BACKGROUND OF THE INVENTION

Suspension systems for automotive vehicles provide vehicle passengers with a more comfortable ride. Aft suspension systems utilize air springs, rather than traditional coil springs, and provide different suspension qualities that may be preferable in some vehicles to traditional coil spring suspensions.

A conventional air spring is a device that is arranged between a vehicle body and chassis. The typical air spring has at least one working space, or cavity that is filled with compressed air. Air spring pistons typically seal the air chamber against a hydraulic shock absorber (damper). The cavity filled with compressed air at least partially fills a bellow, and the bellow is connected to a top cap using a clamping ring, which applies a significant amount of force the top cap. Since the top cap is made of a plastic material, the top cap alone cannot withstand the compressive force applied by the clamping ring to secure the bellow to the top cap. Therefore, a metal ring is used to provide support for the top cap against the compressive radial force of the clamping ring, such that the top cap has sufficient support to withstand the application of the compressive force from the clamping ring. The metal ring is costly to manufacture, due to expensive material costs and complex manufacturing processes.

Accordingly, there exists a need for an air spring assembly which incorporates a support ring that is more easily manufactured, and is less costly.

SUMMARY OF THE INVENTION

In one embodiment, the present invention is a support ring used as part of an air spring assembly, where the support ring provides support for a top cap against radial forces applied by a clamping ring.

The support ring is made of a plastic material which is less costly than a metal support ring. The plastic material has high creep resistance, which provides increased strength and improved creep resistance, to withstand the compressive radial forces of the clamping ring. Because the support ring and top cap are both made of plastic, they may be produced at the same manufacturing location using similar equipment, reducing cost.

In one embodiment, the support ring having the high creep resistance plastic material is made using an injection molding process having one or more gates through which the molten plastic material is injected into a mold. The configuration of the gates affects the flow of the plastic material into the mold. The high creep resistance plastic material is oriented during the injection molding process around the entire circumference of the support ring, to provide sufficient strength to withstand the radial forces from the clamping ring. In one embodiment, once the support ring is formed, the top cap, which is also made of plastic, is overmolded such that a portion of the top cap is overmolded around the support ring. In another embodiment, the support ring is press-fit into the top cap.

The support ring may be made having different dimensions, such as varying width, inner diameter, and outer diameter, such that the support ring may be made to be suitable for varying air spring applications.

In one embodiment, the present invention is a support ring used as part of an air spring assembly, where the air spring assembly includes a top cap, a support area formed as part of the top cap, and a support ring made of a plastic material connected to the top cap such that the support ring reinforces the support area. A clamping ring is connected to the top cap such that the clamping ring circumscribes the support area. At least one free end of a bellow is disposed between the clamping ring and the support area of the top cap, such that the clamping ring applies force to the support area of the top cap and secures the free end of the bellow to the top cap.

In one embodiment, the width of the support ring is substantially equal to the width of the support area, but it is within the scope of the invention that the width of the support area may be less than the width of the support ring.

In an embodiment, the support ring is made from a material containing a high creep resistance plastic material. In one embodiment, the high creep resistance plastic material has less than 40% increase in strain over time (i.e., greater than 1000 hours) at room temperature. In one embodiment, the high creep resistance plastic material is Solvay Technyl A218 V35, but it is within the scope of the invention that other types of materials may be used, having greater or less increase in strain over time, depending upon what is required for a particular application.

In other embodiments, the high creep resistance plastic material used to make the support ring may be a plastic material, such as, but not limited to nylon, Polypropylene (PP), Thermoplastic Polyurethane (TPU), Polybutylene Terephalate (PBT), Polyoxymethoylene (POM), Polycarbonate (PA), Acrylonitrile Butadiene Styrene (ABS), and High-density Polyethylene (HDPE).

In an embodiment, the support ring is first formed using an injection molding process, and the top cap is injection molded such that a portion of the top cap is formed around the support ring. However, in an alternate embodiment, the support ring and top cap are formed using a two-stage, or two-shot injection molding process, where the support ring is formed in a mold first, and the top cap is then formed using the same mold after the formation of the support ring is completed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
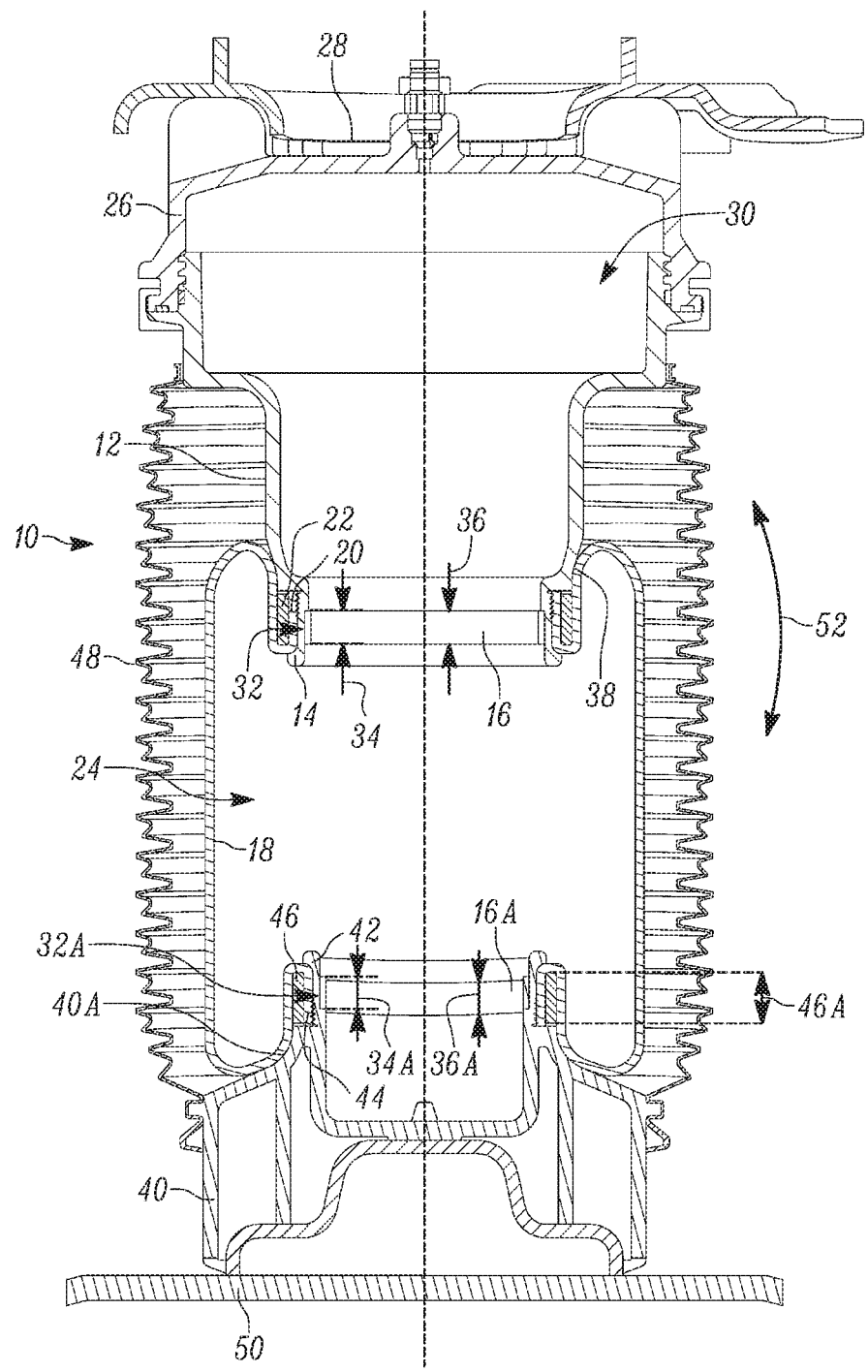
FIG. 1 is a sectional view of an air spring assembly having a support ring, according to embodiments of the present invention.
Figure 2:
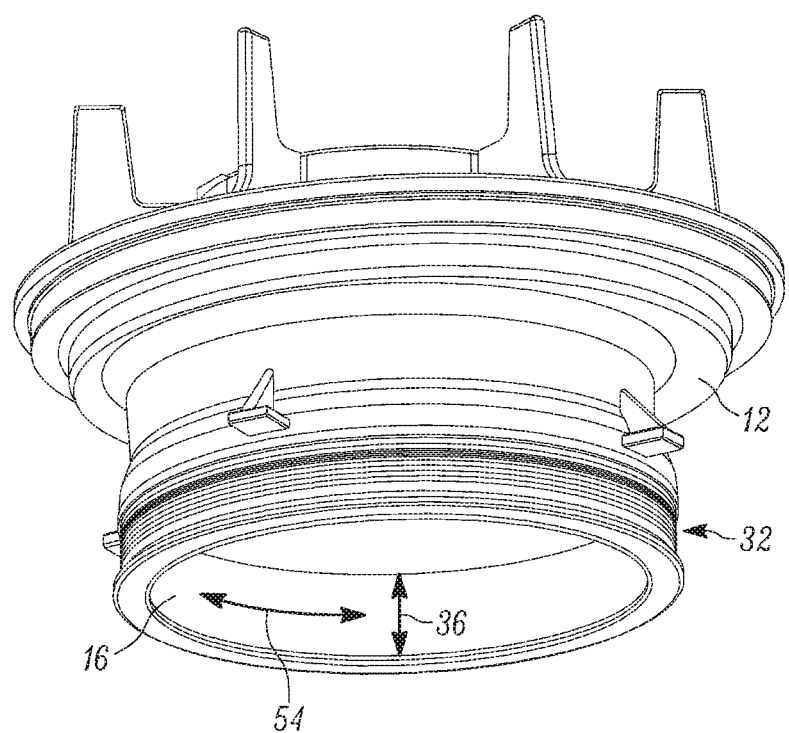
FIG. 2 is a perspective view of a top cap used as part of the air spring assembly shown in FIG. 1, where a portion of the top cap has been partially overmolded around a support ring, according to embodiments of the present invention.

An air spring assembly having an overmolded plastic support ring according to the present invention is shown in FIGS. 1-2, generally at 10. The air spring assembly includes a top cap 12, and the top cap 12 includes an outer flange 14. The top cap 12 is made of a plastic material, a portion of which is overmolded onto an outer surface of a support ring 16. The air spring 10 also includes a bellow 18, which is flexible and able to change shape during vehicle travel. A free end 20 of the bellow 18 is clamped between a clamping ring 22 and a portion of the outer flange 14. The bellow 18 includes a cavity, shown generally at 24, which is generally filled with air.

The top cap 12 includes an upper housing portion 26, and the upper housing portion 26 is connected to another component of a vehicle, such the frame 28 of the vehicle, but it is within the scope of the invention that the upper housing portion 26 may be connected to other components of the vehicle as well.

The top cap 12 also has a cavity, shown generally at 30 which is in fluid communication with the cavity 24 of the bellow 18. The cavities 24,30 define a volume which changes during vehicle travel.

The top cap 12 is made of an injection molded plastic, and a portion of the outer flange 14 is overmolded around the support ring 16 as mentioned above, such that the support ring 16 provides structural support to a specific area of the outer flange 14. The area of the outer flange 14 reinforced by the support ring 16 is a clamping area, or support area, shown generally at 32. The width 34 of the support area 32 generally corresponds to the width 36 of the support ring 16. Because a portion of the top cap 12 is overmolded around the support ring 16, the support ring 16 is in contact with part of the inner surface of the outer flange 14.

As mentioned above, the free end 20 of the bellow 18 is clamped between the clamping ring 22 and a portion of the outer flange 14. A portion of the bellow 18 also extends around the clamping ring 22, and because of the pressure inside the cavity 24, a portion of the outer surface of the bellow 18 is pressed against part of the outer surface 38 of the top cap 12. The outer surface 38 functions as a contour shell, which defines a portion of the shape of the bellow 18 as the bellow 18 moves during operation of the air spring assembly 10.

The air spring assembly 10 in this embodiment also includes a lower cap portion 40 having an upper extension 42, where the lower cap portion 40 is overmolded such that a portion of the upper extension 42 is overmolded onto the outer surface of a second support ring 16A. The other free end 44 of the bellow 18 is clamped between the upper extension 42 and a second clamping ring 46. The area of the upper extension 42 reinforced by the support ring 16A is a second clamping area, or second support area, shown generally at 32A. The width 34A of the support area 32A generally corresponds to the width 36A of the support ring 16A. In this embodiment, the width 46A of the clamping ring 46 is greater than the width 36A of the support ring 16A, but it is within the scope of the invention that the width 46A of the clamping ring 46 may be varied, such that the width 46A of the clamping ring 46 may be substantially equal to the width 16A of the support ring 16A.

A portion of the bellow 18 also extends around the second clamping ring 46, and because of the pressure inside the cavity 24, a portion of the outer surface of the bellow 18 is pressed against part of the outer surface 40A of the lower cap portion 40. The outer surface 40A functions as a contour shell, which defines a portion of the shape of the bellow 18 as the bellow 18 moves during operation of the air spring assembly 10.

The air spring assembly 10 also includes a gaiter 48, shown in FIG. 1, is connected to the lower cap portion 40 and the top cap 12. The gaiter 48 provides protection for the air spring assembly 10 against dirt and debris during vehicle travel.

Both support rings 16,16A in this embodiment provide support for the portion of the top cap 12 and the portion of the lower cap portion 40, which are subjected to clamping forces from the respective clamping rings 22,46.

The lower cap portion 40 is connected to another part of the suspension system of the vehicle, such as the vehicle axle 50. As the axle 50 moves from (operation of the vehicle) the lower cap portion 40 moves along the arc-shaped path indicated by the arrow 52. The lower cap portion 40 moves along the arc-shaped path 52, which corresponds to the articulation of the axle 50 relative to the rest of the vehicle, and the volume of the cavities 24,30 change during vehicle travel, as the lower cap portion 40 moves along the arc-shaped path 52.

It is also within the scope of the invention that instead of being formed separately, the support rings 16,16A may be formed with the top cap 102 and the lower cap portion 40, respectively, using a two-shot, or two-stage stage injection molding process.

The support rings 16,16A are made from a material containing a high creep resistance plastic material. In one embodiment, the high creep resistance plastic material has less than 40% increase in strain over time (i.e., greater than 1000 hours) at room temperature. In one embodiment, the high creep resistance plastic material is Solvay Technyl A218 V35, but it is within the scope of the invention that other types of materials may be used, having greater or less increase in strain over time, depending upon what is required for a particular application. In other embodiments, the high creep resistance plastic material used to make the support ring may be a plastic material, such as, but not limited to nylon, Polypropylene (PP), Thermoplastic Polyurethane (TPU), Polybutylene Terephalate (PBT), Polyoxymethoylene (POM), Polycarbonate (PA), Acrylonitrile Butadiene Styrene (ABS), and High-density Polyethylene (HDPE). To maximize the strength of the support rings 16,16A, the high creep resistance plastic material is oriented in a longitudinal direction, an example of which is indicated by arrow 54 in FIG. 2. In one embodiment, the high creep resistance plastic material is oriented around the entire circumference of the support rings 16,16A. Also, the support rings 16,16A may be made in various sizes to have different levels of strength to accommodate use in different air spring applications, having different clamping strength requirements. The width 36,36A of the support rings 16,16A, along with the outer diameter and inner diameter, may be varied to provide different levels of strength. The amount of the high creep resistance plastic material used may be increased as well.

During assembly, the support ring 16 is formed using an injection molding process. After the support ring 16 is formed, the top cap 12 is formed using an injection molding process, such that a portion of the top cap 12 is formed around the support ring 16 as shown in FIGS. 1-2. At some point during the assembly process, once the top cap 12 and support ring 16 are completed, the free end 20 of the bellow 18 is clamped to the top cap 12 using the clamping ring 22. The support area 32 of the top cap 12 is in contact with the free end 20 of the bellow 18 and is compressed by the clamping ring 22 against the outer surface of the top cap 12. The support ring 16 is used for reinforcing the top cap 12 against the clamping forces of the clamping ring 22 because the top cap 12 alone does not have sufficient strength, and would deflect beyond acceptable limits, or permanently deform when the clamping ring 22 is applied.

In the embodiment described above, the support ring 16 is first formed using an injection molding process, which includes the use of a high creep resistance plastic material, and the top cap 12 is injection molded such that a portion of the top cap 12 is formed around the support ring 16. However, in an alternate embodiment, the support ring 16 and top cap 12 may be formed using a two-stage, or two-shot injection molding process, where the support ring 16 is formed in a mold first, and the top cap 12 is then formed using a different material, and the same mold, after the formation of the support ring 16 is completed. The injection molding process is chosen based on choice of material and the size of the support ring 16 and top cap 12 needed for the particular air spring application. The same manufacturing process may also be applied to the lower cap portion 40 and the second support ring 16A.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising: an air spring assembly, including:
   a top cap including a support area, the top cap formed from a first plastic material;
   a support ring made of a second plastic material, the support ring connected to the top cap such that the support ring reinforces the support area, wherein the second plastic material of the support ring is different than the first plastic material of the top cap; and
   a clamping ring connected to the top cap such that the clamping ring circumscribes the support area;
   a bellow; and
   at least one free end being part of the bellow;
   wherein the at least one free end of the bellow is disposed between the clamping ring and the support area of the top cap, such that the clamping ring applies force to the support area of the top cap and secures the free end of the bellow to the top cap.

2. The apparatus of claim 1, wherein the support ring is made from a high creep resistance plastic material.

3. The apparatus of claim 2, wherein the high creep resistance plastic material has less than a 40% increase in strain over time.

4. The apparatus of claim 2, wherein the high creep resistance plastic material further comprising Solvay Technyl A218 V35.

5. The apparatus of claim 1, wherein the width of the support ring is substantially equal to the width of the support area.

6. The apparatus of claim 1, wherein the support ring is made from a material being one selected from the group consisting of nylon, Polypropylene (PP), Thermoplastic Polyurethane (TPU), Polybutylene Terephalate (PBT), Polyoxymethoylene (POM), Polycarbonate (PA), Acrylonitrile Butadiene Styrene (ABS), and High-density Polyethylene (HDPE).

7. The apparatus of claim 1, wherein the support ring is partially encapsulated within the first plastic material of the top cap.

8. A method of securing a bellow to a top cap as part of an air spring assembly, comprising the steps of:
   providing a top cap from a first plastic material to include a support area;
   providing a support ring made of a second plastic material, wherein the second plastic material is different than the first plastic material;
   providing a clamping ring;
   providing a bellow;
   providing at least one free end being part of the bellow;
   integrally forming a portion of the top cap from the first plastic material around the support ring such that the support ring is disposed radially inward of the support area and reinforces the support area;
   placing the at least one free end of the bellow between the clamping ring and the support area of the top cap; and
   connecting the clamping ring to the top cap such that the at least one free end of the bellow is disposed between the clamping ring and the support area of the top cap, the clamping ring circumscribes the support area, and the clamping ring applies force to the support area of the top cap, securing the free end of the bellow to the top cap.

9. The method of claim 8, further comprising the steps of making support ring from a high creep resistance plastic material.

10. The method of claim 9, further comprising the steps of providing the high creep resistance plastic material to have less than a 40% increase in strain over time.

11. The method of claim 9, further comprising the steps of providing the high creep resistance plastic material to be Solvay Technyl A218 V35.

12. The method of claim 9, further comprising orientating the high creep resistance material in a longitudinal direction about a circumference of the support ring.

13. The method of claim 8, further comprising the steps of forming the support ring such that the width of the support ring is substantially equal to the width of the support area.

14. The method of claim 8, further comprising the steps of selecting the material for making the support ring from the group consisting of nylon, Polypropylene (PP), Thermoplastic Polyurethane (TPU), Polybutylene Terephalate (PBT), Polyoxymethoylene (POM), Polycarbonate (PA), Acrylonitrile Butadiene Styrene (ABS), and High-density Polyethylene (HDPE).

15. The method of claim 8, further comprising the steps of forming the support ring and the top cap using a two-stage injection molding process.

* * * * *